United States Patent [19]
Patel et al.

[11] Patent Number: 4,699,628
[45] Date of Patent: Oct. 13, 1987

[54] PROCESS FOR THE PREPARATION OF A WATER SOLUBLE DIRECT GREEN POLYAZO DYESTUFFS MIXTURE IN SITU AND WATER SOLUBLE DIRECT GREEN POLYAZO DYESTUFFS MIXTURE OBTAINED THEREBY

[75] Inventors: Nagajibhai T. Patel; Subrao S. Kulkarni; Garish I. Bhatt, all of Gujarat, India

[73] Assignee: The Atul Products Limited, Gujarat, India

[21] Appl. No.: 895,973

[22] Filed: Aug. 12, 1986

[30] Foreign Application Priority Data

Aug. 16, 1985 [IN] India ........................................ 21785

[51] Int. Cl.$^4$ ........................ C09B 49/00; C09B 29/00
[52] U.S. Cl. ............................................ 8/641; 8/437; 8/673; 8/687; 8/918; 8/919
[58] Field of Search ............................ 8/641, 673, 687

[56] References Cited

U.S. PATENT DOCUMENTS

| B 444,294 | 3/1976 | Stryker | 534/667 |
| 480,326 | 8/1892 | Hoffmann | 534/840 |
| 3,898,033 | 8/1975 | McLeod | 8/641 |
| 3,927,963 | 12/1975 | Papa et al. | 8/641 |
| 4,235,773 | 11/1980 | Huhne et al. | 534/680 |
| 4,260,391 | 4/1981 | Lacroix | 8/519 |

FOREIGN PATENT DOCUMENTS 1417428 10/1975 United Kingdom .
2165853 4/1986 United Kingdom .
462849 3/1975 U.S.S.R. .

OTHER PUBLICATIONS

Colour Index, Third Edition, vol. 4 (Soc. Dyers and Colourists, 1971), O.I. 14045 and C.I. 20495, pp. (4059 and 4150).

Primary Examiner—A. Lionel Clingman
Attorney, Agent, or Firm—Fitch, Even, Tabin & Flannery

[57] ABSTRACT

A process for the preparation of a water soluble direct green polyazo dyestuffs mixture in situ comprising phosgenation of a mordant yellow dye and an acid green dye using phosgene gas in an aqueous alkaline medium at a temperature between 50° C. to 80° C. and isolating or recovering the dyestuffs mixture from the phosgenation reaction mass and water soluble direct green polyazo dyestuffs mixture obtained thereby.

16 Claims, 5 Drawing Figures

FORMULA I A
FIG. 1A

FORMULA II A
FIG. 2A

FORMULA III A
FIG. 3A

FORMULA IV
FIG. 4

FORMULA V
FIG. 5

PROCESS FOR THE PREPARATION OF A WATER SOLUBLE DIRECT GREEN POLYAZO DYESTUFFS MIXTURE IN SITU AND WATER SOLUBLE DIRECT GREEN POLYAZO DYESTUFFS MIXTURE OBTAINED THEREBY

This invention is concerned with a process for the preparation of a water soluble direct green polyazo dyestuffs mixture in situ and water soluble direct green polyazo dyestuffs mixture obtained thereby.

Water soluble direct green dyestuffs commonly used for directly dyeing cellulose materials such as cotton or jute fibres or paper are benzidine based. Water soluble direct green benzidine dyestuffs are prepared by tetrazotizing benzidine followed by coupling first with 1-amino-8-hydroxy-naphthalene-3,6-disulfonic acid (H-acid), secondly with aniline diazo or substituted aniline diazo, where substituents are chloro, nitro, carboxy or sulphonic acid group and finally with phenol, resorcinol or salicyclic acid. Benzidine is reported to be carcinogenic and has already been banned in some countries and is being banned in several other countries. Strenous efforts are, therefore, in progress to find out water soluble direct green dyestuffs which are not benzidine based. As a result of extensive research and experiments, we have been able to obtain a water soluble direct green polyazo dyestuffs mixture which has been found to be excellent for directly dyeing cellulose materials such as cotton or jute fibres or paper or leather.

Accordingly, the object of the present invention is to provide a process for the preparation of a water soluble direct green polyazo dyestuffs mixture in situ.

According to the present invention there is thus provided a process for the preparation of a water soluble direct green polyazo dyestuffs mixture of the formula IA, IIA and IIIA of the accompanying drawings, wherein R is hydrogen, sodium or potassium and X is lower alkyl group such as methyl or ethyl group, lower alkoxy group such as methoxy or ethoxy group, chloro or nitro group, carboxy or sulfonic acid group or hydrogen at the 2, 3 or 4 position, said process comprising phosgenation of 1 part by weight of mordant yellow dye of the formula IV of the accompanying drawings, wherein R is as defined above and 3 to 12 parts by weight of acid green dye of the formula V of the accompanying drawings, where R and X are as defined above using phosgene gas of the formula $COCl_2$ in an aqueous alkaline medium at a temperature between 50° C. to 80° C. to form a dyestuffs mixture of the said formulae IA, IIA and IIIA in situ and isolating or recovering the said mixture from the phosgenation reaction mass in a manner herein described.

Preferably, the phosgenation reaction is carried out at a temperature between 65° C. to 75° C. In phosgenation reactions water, a mono or disazo dye or dyes having a free amino group or groups, when treated with phosgene in aqueous medium lead to the formation of Urea derivatives. Alkali is used as an acid binder which helps as a condensing agent. The pH range of phosgenation is 8 to 8.5. Range of quantity of phosgene is 12 to 18 parts by weight. The common ingredients used to obtain condensation are sodium or potassium hydroxide, carbonate or bicarbonate to get the pH range 8–8.5. Range of using such dye ingredients mainly depends on the quality of the end product-mix needed and reactivities of different ingredients. The dyestuff mixture is precipitated with about 10% salt on the total volume of the reaction. Acid is used, where needed to bring down the pH to 6.5–7.5.

Preferably, the alkali used in the aqueous alkaline medium is sodium or potassium hydroxide, carbonate or bicarbonate.

Preferably, 1 part by weight of the mordant yellow dye of the said formula IV and 6 parts by weight of the acid green dye of the said formula V are phosgenated.

Isolation or recovery of the dyestuffs mixture of the formulae IA, IIA and IIIA from the phosgenation reaction mass is carried out by precipitating the said mixture by treating the said reaction mass with an alkali salt such as sodium or potassium chloride or sulphate or an aqueous alkali salt solution such as that of sodium or potassium chloride or sulphate or with a mineral acid such as hydrochloric acid or sulphuric acid at a temperature between 30° to 90° C. and drying the precipitate at a temperature between 85° to 95° C.

The following example is illustrative of the present invention, in which all the parts are by weight:

EXAMPLE 1

Figure 1:
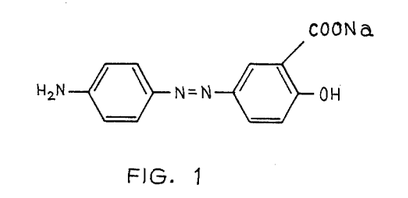
Figure 1A:
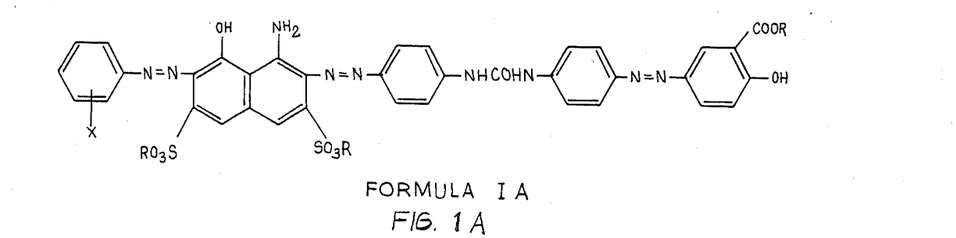
Figure 2:
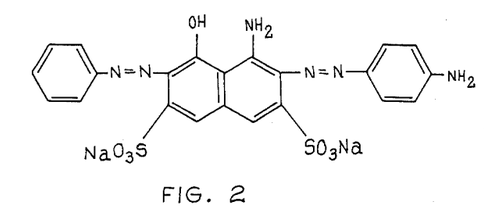
Figure 2A:
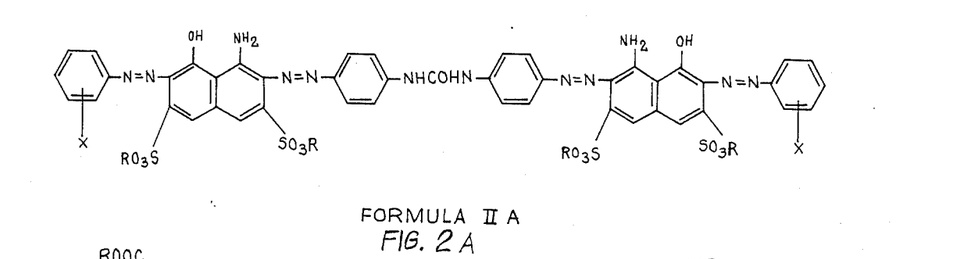

10.0 parts of the mordant yellow dye of the formula shown in FIG. 1 of the accompanying drawings [Mordant Yellow 12 (C.I. No. 14045). Ref. Colour Index published by The Society of Dyers and Colourists, the United Kingdom and American Association of Textile Chemists and Colourists, The United States of America] and 61.4 parts of the acid green dye of the formula shown in FIG. 2 of the accompanying drawings [Acid Green 20, (C.I. No. 20495). Ref. Colour Index] were stirred with 480 parts of water. The resulting reaction mass was heated to 65°–70° C. and 15 parts of phosgene gas was passed therethrough over a period of 6 to 8 hours maintaining alkaline test by the addition of 15 to 20 parts of sodium carbonate. At 70°–75° C., the reaction mass was then treated with sodium chloride and filtered. The precipitate was dried at 85°–90° C. in an electric oven to obtain a dyestuffs mixture of the formulae shown in FIGS. 3A, 4A and 5A of the accompanying drawings.

Figure 3A:
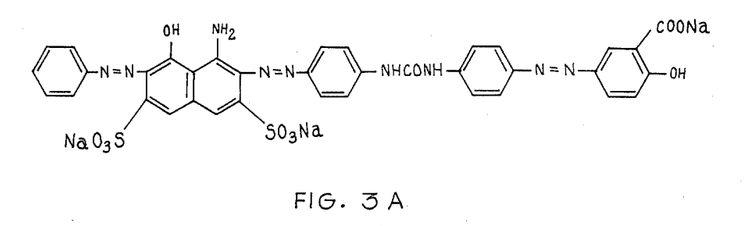
Figure 4:
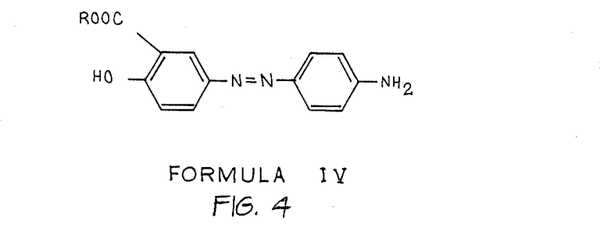
Figure 4A:
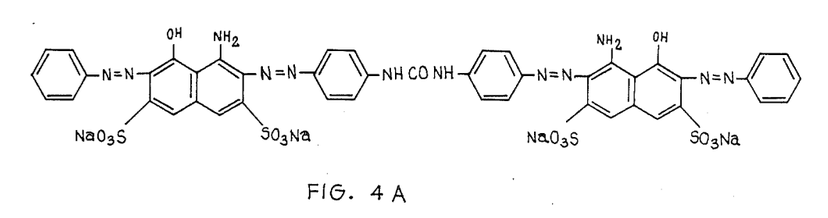
Figure 5:
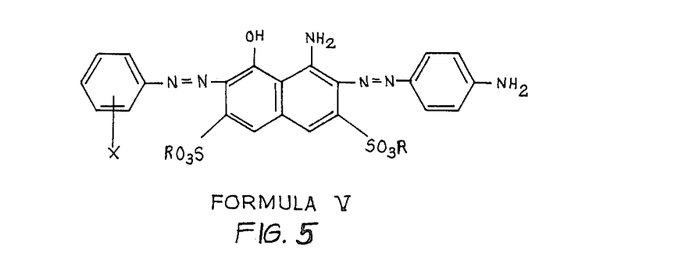
Figure 5A:
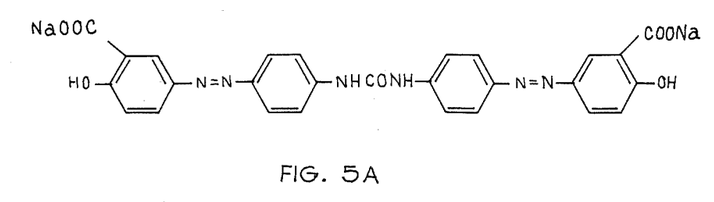

On chemical analysis, the percentages of the dyestuffs of the formulae shown in FIGS. 3A, 4A and 5A in the mixture was found to be as under:

| | |
|---|---|
| Dyestuff of the formula shown in FIG. 3A | 60 to 65% |
| Dyestuff of the formula shown in FIG. 4A | 20 to 25% |
| Dyestuff of the formula shown in FIG. 5A | 5 to 10% |

Using the dyestuff mixture of Example 1, cotton fibres, jute fibres, paper and leather were dyed in known manner to obtain brilliant green shade. The tone and fastness properties of the cotton and jute fibres, and paper dyed with the dyestuff mixture of Example 1 were found to be as good as those obtained with water soluble direct green benzidine dyestuffs namely Direct Green 6 (C.I. no. 30295 in Colour Index) and Direct Green 8 (C.I. No. 30315 in Colour Index) under identical dyeing conditions.

The dyestuffs mixture of the present invention is thus an ideal substitute for benzidine based water soluble direct green dyestuffs.

What is claimed is:

1. A process for the preparation of a water soluble direct green polyazo dyestuffs mixture of the formulae, and said process comprising phosgenation of 1 part by weight of mordant yellow dye of the formula, and 3 to 12 parts by weight of acid green dye of the formula, using phosgene gas of the formula COCl$_2$, in an aqueous alkaline medium at a temperature between 50° C. to 80° C. to form a dyestuffs mixture of the said formulae, and in situ and isolating or recovering the said mixture from the phosgenation reaction mass, wherein R is hydrogen, sodium or potassium and X is methyl, ethyl, methoxy, ethoxy, chloro, nitro, carboxy, sulphonic or hydrogen at the 2, 3 or 4 position.

2. A process as claimed in claim 1, wherein the phosgenation reaction is carried out at a temperature between 65° to 70° C.

3. A process as claimed in claim 1, wherein the alkali used in the aqueous alkaline medium is selected from the group consisting of sodium hydroxide, potassium hydroxide, carbonate or bicarbonate.

4. A process as claimed in claim 2, wherein the alkali used in the aqueous alkaline medium is selected from the group consisting of sodium hydroxide, potassium hydroxide, carbonate or bicarbonate.

5. A process as claimed in claim 1, wherein 1 part by weight of the mordant yellow dye of the said formula, and 6 parts by weight of the acid green dye of the said formula, are phosgenated.

6. A process as claimed in claim 2, wherein 1 part by weight of the mordant yellow dye of the said formula, and 6 parts by weight of the acid green dye of the said formula, are phosgenated.

7. A process as claimed in claim 3, wherein 1 part by weight of the mordant yellow dye of the said formula, and 6 parts by weight of the acid green dye of the said formula, are phosgenated.

8. A process as claimed in claim 4, wherein 1 part by weight of the mordant yellow dye of the said formula, and 6 parts by weight of the acid green dye of the said formula, are phosgenated.

9. A water soluble direct green polyazo dyestuffs mixture of the formulae, and made according to the process of claim 1, wherein R is hydrogen, sodium or potassium and X is methyl, ethyl, methoxy, ethoxy, chloro, nitro, carboxy, sulphonic or hydrogen at the 2, 3 or 4 position.

10. A water soluble direct green polyazo dyestuffs mixture of the formulae, and made according to the process of claim 2, wherein R is hydrogen, sodium or potassium and X is methyl, ethyl, methoxy, ethoxy, chloro, nitro, carboxy, sulphonic or hydrogen at the 2, 3 or 4 position.

11. A water soluble direct green polyazo dyestuffs mixture of the formulae, and made according to the process of claim 3, wherein R is hydrogen, sodium or potassium and X is methyl, ethyl, methoxy, ethoxy, chloro, nitro, carboxy, sulphonic or hydrogen at the 2, 3 or 4 position.

12. A water soluble direct green polyazo dyestuffs mixture of the formulae, and made according to the process of claim 4, wherein R is hydrogen, sodium or potassium and X is methyl, ethyl, methoxy, ethoxy, chloro, nitro, carboxy, sulphonic or hydrogen at the 2, 3 or 4 position.

13. A water soluble direct green polyazo dyestuffs mixture of the formulae, and made according to the process of claim 5, wherein R is hydrogen, sodium or potassium and X is methyl, ethyl, methoxy, chloro, nitro, carboxy, sulphonic or hydrogen at the 2, 3 or 4 position.

14. A water soluble direct green polyazo dyestuffs mixture of the formulae,

-continued and made according to the process of claim 6, wherein R is hydrogen, sodium or potassium and X is methyl, ethyl, methoxy, ethoxy, chloro, nitro, carboxy, sulphonic or hydrogen at the 2, 3 or 4 position.

15. A water soluble direct green polyazo dyestuffs mixture of the formulae, and made according to the process of claim 7, wherein R is hydrogen, sodium or potassium and X is methyl, ethyl, methoxy, ethoxy, chloro, nitro, carboxy, sulphonic or hydrogen at the 2, 3 or 4 position.

16. A water soluble direct green polyazo dyestuffs mixture of the formulae, and made according to the process of claim 8, wherein R is hydrogen, sodium or potassium and X is methyl, ethyl, methoxy, ethoxy, chloro, nitro, carboxy, sulphonic or hydrogen at the 2, 3 or 4 position.

* * * * *

UNITED STATES PATENT AND TRADEMARK OFFICE
CERTIFICATE OF CORRECTION

PATENT NO. : 4,699,628

DATED : October 13, 1987

INVENTOR(S) : Nagajibhai T. Patel et al.

It is certified that error appears in the above-identified patent and that said Letters Patent is hereby corrected as shown below:

Face of Patent, under Other Publications, after "(SOC. DYERS AND COLOURISTS, 1971)," change "O" to --C--.

Face of Patent, under Other Publications, change "pp. (4059 and 4150)" to -- (pp. 4059 and 4150)--.

In the Specification:

Column 1, line 3, "IN SITU" should be italicized or underlined.

Column 1, line 10, "in situ" should be italicized or underlined.

Column 1, line 33, "in situ" should be italicized or underlined.

Column 1, line 23, change "Strenous" to -- Strenuous --.

Column 1, line 51, "in situ" should be italicized or underlined.

In the Claims:

Column 3, line 25, after the formula ending with "=N", insert -- and --.

Column 3, line 37, delete "and" before "said".

Column 4, line 14, after the formula ending with "=N", insert --and--.

UNITED STATES PATENT AND TRADEMARK OFFICE
CERTIFICATE OF CORRECTION

PATENT NO. : 4,699,628

DATED : October 13, 1987

INVENTOR(S) : Nagajibhai T. Patel et al.

It is certified that error appears in the above-identified patent and that said Letters Patent is hereby corrected as shown below:

Column 4, line 26, delete "and" (first occurrence); and "in situ" should be italicized or underlined.

Column 6, line 14, after the formula ending with "=N", insert -- and --.

Column 6, line 26, delete "and" before "made".

Column 6, line 53, after the formula ending with "=N", insert -- and --.

Column 6, line 65, delete "and" before "made".

Column 7, line 25, after the formula ending with "=N", insert -- and --.

Column 7, line 38, delete "and" before "made".

Column 7, line 66, after the formula ending with "=N", insert -- and --.

Column 8, line 12, delete "and" before "made".

Column 8, line 40, after the formula ending with "=N", insert -- and --.

Column 8, line 52, delete "and" before "made".

Column 9, line 15, after the formula ending with "=N", insert -- and --.

Column 9, line 28, delete "and" before "made".

Column 10, line 3, after the formula ending with "=N", insert -- and --.

UNITED STATES PATENT AND TRADEMARK OFFICE
CERTIFICATE OF CORRECTION

PATENT NO. : 4,699,628

DATED : October 13, 1987

INVENTOR(S) : Nagajibhai T. Patel et al.

It is certified that error appears in the above-identified patent and that said Letters Patent is hereby corrected as shown below:

Column 10, line 15, delete "and" before "made".

Column 10, line 43, after the formula ending with "=N-⟨⟩", insert -- and --.

Column 10, line 54, delete "and" before "made".

Signed and Sealed this

Fourteenth Day of March, 1989

*Attest:*

DONALD J. QUIGG

*Attesting Officer*  *Commissioner of Patents and Trademarks*